United States Patent

Kimura

[15] 3,684,049

[45] Aug. 15, 1972

[54] VEHICLE FOOT BRAKE LOCKING MECHANISM; FOOT BRAKE LOCKING MECHANISM RELEASE MEANS; AND PARKING BRAKE LOCKING MECHANISM RELEASE MEANS

[72] Inventor: Seiji Kimura, 508 Seijo-Machi, Setagaya-ku, Tokyo 157, Japan

[22] Filed: Feb. 9, 1970

[21] Appl. No.: 9,524

[30] Foreign Application Priority Data

Feb. 19, 1969 Japan ................... 44/011821
May 12, 1969 Japan ................... 44/035715

[52] U.S. Cl. ............... 180/103, 188/140, 188/265, 192/3, 303/20, 303/24, 303/89
[51] Int. Cl. ........................................... B60t 7/12
[58] Field of Search ........ 180/82, 103, 104; 188/110, 188/135, 140, 265; 192/3; 363/3, 20, 24, 89; 74/513

[56] References Cited

UNITED STATES PATENTS

| | | | |
|---|---|---|---|
| 3,498,426 | 3/1970 | Nakano | 192/3 X |
| 3,036,677 | 5/1962 | Prachar | 192/3 X |
| 3,233,153 | 2/1966 | Ryan | 180/82 X |
| 2,272,320 | 2/1942 | Freeman | 180/82 X |
| 3,119,477 | 1/1964 | Ryder | 188/110 X |
| 2,968,378 | 1/1961 | Yanda | 192/3 X |
| 2,323,208 | 6/1943 | Eaton | 180/82 X |
| 3,141,707 | 7/1964 | Nigh | 180/104 X |
| 3,206,116 | 9/1965 | Short | 180/104 UX |

*Primary Examiner*—Benjamin Hersh
*Assistant Examiner*—John P. Silverstrim
*Attorney*—Ostrolenk, Faber, Gerb & Soffen

[57] ABSTRACT

An electrical mechanism for locking the foot brake of a motor vehicle, including a solenoid which causes the foot brake to be locked in position and an electrical relay system comprises of a circuit which, when completed, actuates the solenoid; the relay system circuit includes the vehicle ignition switch, a stop light switch which is closed when the foot brake is operated and the vehicle rear stop lights are lit; a first switch which is closed when the automatic locking mechanism has not been activated; three second switches in electric parallel, a first one that is associated with the gear shift lever and is closed when the gear shift lever is in Neutral gear, a second one that may be closed by the vehicle operator if he desires the foot brake to automatically lock, and a third inertia controlled safety switch that is closed only after the vehicle has come to a full stop when there has been a rapid deceleration of the vehicle. The foot brake locking mechanism release means comprises a solenoid, which, when activated, causes release of the foot brake locking mechanism and a second relay system circuit associated with this solenoid, which second circuit must be completed to activate the solenoid; the second circuit includes the vehicle ignition switch, a second switch which is closed only when the gear shift lever is in one of the driving gears, a third switch which is closed when the motor is operating, a fourth switch which is closed only when the foot brake is locked, a fifth switch which is closed just as the vehicle operator initiates movement of the vehicle, and in parallel with each other there are a vacuum switch connected with the vehicle motor induction manifold to be closed upon pressure reduction in this manifold and a gravity controlled switch means which is closed when the vehicle is on a level surface and is open when the vehicle is facing uphill or downhill. The parking brake locking mechanism release means also comprises a solenoid which, when actuated, releases the parking brake and a third relay system circuit, which must be completed to activate the solenoid. The third circuit includes switches functionally identical to the switches for the foot brake locking mechanism release means, but in place of the switch that senses that the foot brake is locked, there is a switch that senses that the parking brake is on.

30 Claims, 2 Drawing Figures

United States Patent
Kimura

[15] 3,684,049
[45] Aug. 15, 1972

PATENTED AUG 15 1972

INVENTOR
SEIJI KIMURA
BY
Ostrolenk, Faber, Gerb & Soffen
ATTORNEYS

VEHICLE FOOT BRAKE LOCKING MECHANISM; FOOT BRAKE LOCKING MECHANISM RELEASE MEANS; AND PARKING BRAKE LOCKING MECHANISM RELEASE MEANS

This invention relates to a motor vehicle foot brake locking mechanism and release means therefor and to a parking brake release means.

It is frequently desirable to lock the foot brake on a motor vehicle in the depressed or applied position. For example, when an operator halts a vehicle by depressing the foot brake pedal, he may find it uncomfortable or tiring to hold the brake pedal depressed for a prolonged period, such as while the vehicle is standing at a railroad crossing. Should the operator momentarily release the brake pedal, the vehicle might roll. An automobile with automatic transmission would creep forward if pressure on the brake pedal is relaxed. Furthermore, in the event that one vehicle is struck by another, there is a danger that the driver of the struck vehicle will be momentarily jolted into releasing the foot brake pedal. This could cause the struck vehicle to move into danger and could cause whiplash injury to the driver. However, if the foot brake is locked when a vehicle comes to a halt, then even if the driver's foot is jolted off the foot brake pedal, the vehicle will not move.

A foot brake locking mechanism should operate (a) when the foot brake pedal is depressed and the vehicle is in Neutral gear, or (b) when the vehicle operator closes a switch to cause the foot brake locking mechanism to operate as soon as the foot brake pedal is depressed, or (c) when the vehicle has been rapidly brought to a halt and there is a danger that the vehicle behind might strike the now halted vehicle. Accordingly, the foot brake locking mechanism of the present invention will operate when any of the above noted conditions occurs.

A vehicle parking (or hand or emergency) brake is manually applied through a hand or foot operated lever. Conventionally, it is locked into position by a pawl and ratchet combination.

Automatic means may be provided for releasing either or both of the vehicle foot brake locking mechanism and the vehicle parking brake. Thus, when the vehicle operator wishes to move the vehicle, the brakes will not impede movement. The automatic means, however, should be designed so as not to release either of the brakes when the vehicle is on an incline and is to move uphill until after the vehicle is ready to move in the desired direction without rollback.

A parking brake is only occasionally applied, e.g. when the car is parked or expected to stand still for an extended period. Thus, it would not be bothersome for the operator to have to manually release the parking brake. Here the release means of the invention is a convenience.

However, the foot brake pedal is frequently depressed. Were it to lock on every occasion, having to manually release the foot brake pedal each time would prove very annoying to the operator. He would avoid using the important safety advance provided by the foot brake locking mechanism. Thus, it is important here to provide an automatic release means.

For safety reasons, it is desirable that neither the parking nor the foot brakes be released until the vehicle ignition switch is closed, the vehicle motor is operating, the motor is in one of the driving gears, the brake to be released is being applied and the means for initiating motion in the vehicle e.g. the accelerator pedal in automatic transmission vehicles is first operated; and, if the vehicle is on an incline, the operator has opened the throttle sufficiently to prevent rollback as the vehicle starts. Only when all of these conditions are met is it apparent that the operator of the vehicle desires it to move. Accordingly, the automatic foot brake and parking brake locking mechanism release means of the present invention only release the foot brake and/or the parking brake when all the conditions are met.

The foot brake locking mechanism of the present invention includes a solenoid device so connected with the vehicle brakes that when the solenoid device is actuated, a check valve, which is selectively positionable between a one-way flow position and a two-way flow position, is caused to enter its one-way flow mode so that the hydraulic brake fluid is caused only to lock the foot brake. The locking mechanism also includes an electrical relay for actuating the solenoid device. The relay is in a circuit which must be completed for the solenoid device to be activated to lock the foot brake. The circuit includes the vehicle ignition key switch; a vehicle stop light switch, the contacts of which are closed when the brakes are applied; a first switch, the contacts of which are closed when the foot brake locking mechanism has not been activated (this switch reduces unnecessary system deterioration, as described in the detailed description below); and three alternative second switches connected in parallel, the first associated with the gear shift lever to be closed when that lever is in one of Neutral or Park gears, the second to be actuated by the operator of the vehicle if he desires the foot brake to automatically lock when the other switches are closed, and the third inertia controlled switch that is closed upon the vehicle coming to a full halt after rapid deceleration of the vehicle, such as would occur during an emergency stop. (The inertia controlled switch helps prevent chain collisions which occur when a driver, who has made an emergency stop, experiencing relief at having avoided harm, releases the brake pedal and whose now lightly braked vehicle is then struck by another vehicle which impels the struck vehicle into still another vehicle.) When the circuit is completed, the foot brake locking solenoid device shifts the above described check valve to its one-way flow position.

The foot brake locking mechanism release means includes its own solenoid device, which, when activated, releases the foot brake locking mechanism, and includes an electrical relay for actuating the solenoid device. The relay is in a circuit which must be completed before the solenoid device will be activated to release the foot brake. The circuit includes the vehicle ignition key switch, which is closed when the ignition key is at the vehicle "ON" position; a second switch, which is closed when the gear shift lever is in one of the vehicle driving gears; a third switch, which is connected to the vehicle motor through a relay device and which is closed only when the motor is operating; a fourth switch, which is closed only when the foot brake has been locked (this switch prevents system deterioration, as described below in the detailed description); a fifth switch associated with the means which initiates movement of the vehicle, the contacts of which are closed as soon as that means is activated to cause vehicle movement; and in parallel with each other there are, first, a vacuum switch connected with the vehicle motor induction manifold to be closed upon a pressure reduction in this manifold and, second, a gravity controlled switch means which is closed when the vehicle is on a level surface and is open when the vehicle is facing uphill or downhill. (The induction manifold is the air conduit leading to the vehicle carburetor. The pressure in that conduit is reduced when there is a load on the motor, which occurs when the vehicle is about to accelerate and is accelerating and when the vehicle motor is retarding vehicle motion while the throttle is closed.)

The parking brake locking mechanism release means includes its own solenoid device which, when activated, releases the parking brake, and includes an electrical relay for actuating the solenoid device. The relay is in a circuit which must be completed before the solenoid device will be activated to release the parking brake. This circuit includes switches functionally identical to those for the foot brake locking mechanism release means, except that in place of the switch that senses that the foot brake is locked, there is a switch that senses that the parking brake is on.

Accordingly, it is a primary object of the present invention to provide an effective vehicle automatic foot brake locking mechanism, a foot brake locking mechanism release means and a parking brake locking mechanism release means.

It is a further object of the present invention to provide such locking mechanisms and release means in combined form.

It is another object of the present invention to provide an effective vehicle automatic foot brake locking mechanism.

It is another object of the present invention to provide an effective vehicle automatic foot brake locking mechanism release means.

It is another object of the present invention to provide an effective vehicle automatic parking brake locking mechanism release means.

It is a further object of the present invention to cause each of the foregoing mechanisms and means to operate without the operator of a motor vehicle being inconvenienced by having to manually operate extensive, extraordinary equipment.

It is still another object of the present invention to avoid having the movement of a vehicle noticeably affected by the operation of the present invention.

It is a further object of the present invention to provide a mechanism for locking the brakes of a vehicle by locking the foot brake when the vehicle is brought to a temporary halt.

It is yet another object of the present invention to provide a mechanism for locking the brakes of a vehicle automatically when the vehicle is brought to an emergency stop.

It is another object of the present invention to provide a means for releasing the locking mechanism for the foot brake of a vehicle as soon as the driver indicates, by operating the means that initiates vehicle movement while the motor is operating and the vehicle is in one of the driving gears, that the driver wishes the vehicle to move.

It is another object of the present invention to provide a release means for a vehicle parking brake to release the parking brake under the same conditions as just described for the release of the foot brake.

It is yet a further object of the present invention to provide a means for releasing the locking mechanism of the foot brake and/or the parking brake of a vehicle when the vehicle is on an incline while preventing vehicle rollback.

It is still a further object of the present invention to provide a vehicle foot brake locking mechanism, a foot brake locking mechanism release means and a parking brake locking mechanism release means, all of which use electric switching devices.

It is yet another object of the present invention to minimize deterioration and unnecessary use of the apparatus of the invention.

These and other objects of the present invention will become apparent from the following description of the accompanying drawings in which:

Each locking mechanism and release means will be described separately for clarity. It is to be understood that a vehicle will contain all of the mechanisms described. Alternatively, it may contain only certain of the described mechanisms. The foot brake locking mechanism and the release means therefor would usually be provided together since it would be inconvenient to have a foot brake automatically lock, without automatic means being provided for releasing the brake thereafter. The parking brake release means need not be included with the foot brake locking mechanism release means. However, since, as shown below, the parking brake release means and the foot brake locking mechanism release means operate in a similar manner and may even share some components, it is sensible to include them in a single mechanism.

FOOT BRAKE LOCKING MECHANISM

Figures 1, 2:
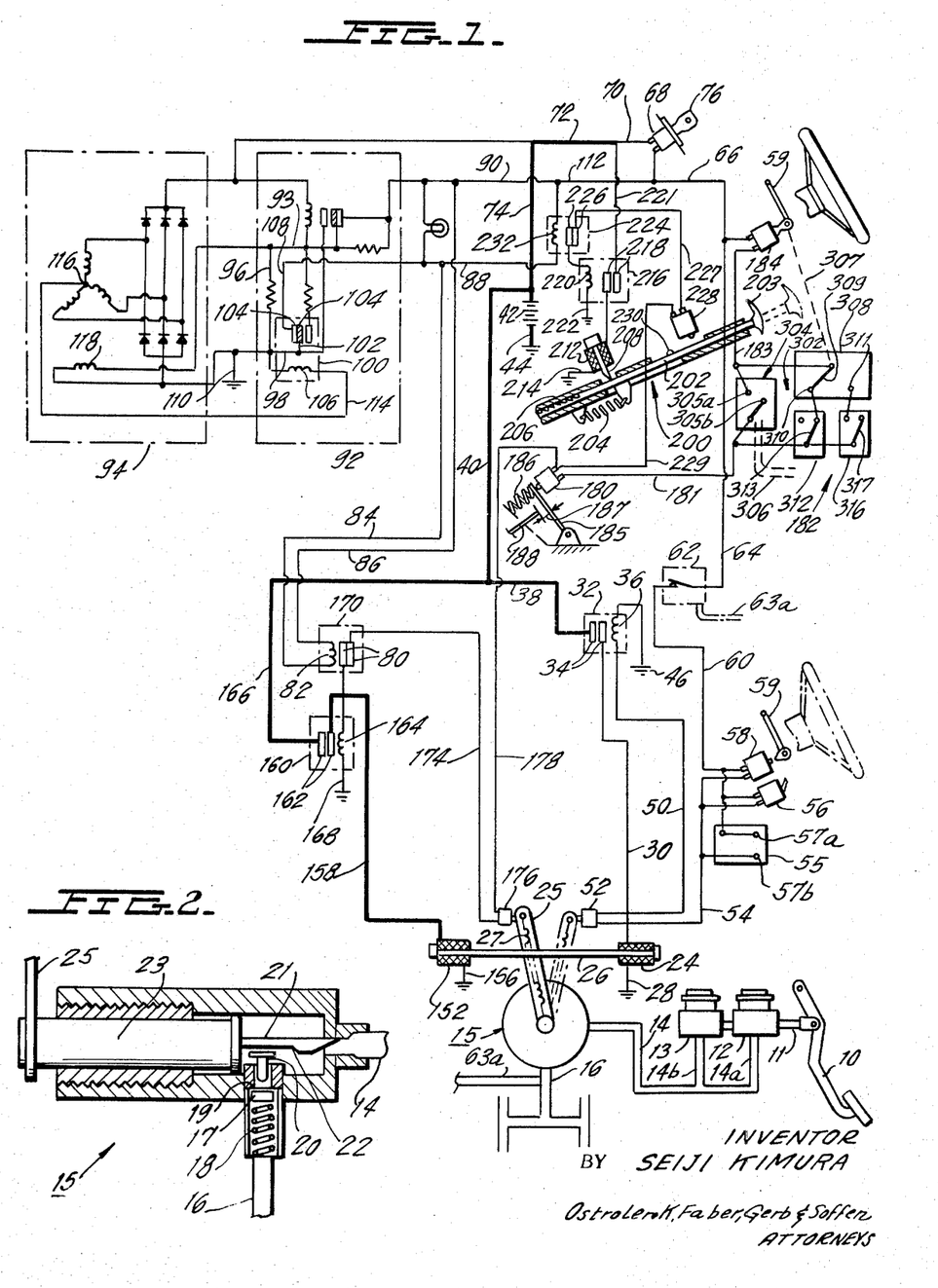
FIG. 1 schematically illustrates a vehicle foot brake automatic locking mechanism, a foot brake locking mechanism release means and a parking brake locking mechanism release means.
FIG. 2 is a side cross-sectional view of the selective two-way-one-way fluid switch of FIG. 1.

Turning to FIG. 1, the conventional foot brake pedal 10 is connected by conventional means 11 to the vehicle hydraulic brake master cylinders 12, 13. Master cylinders 12 and 13 connect through respective conventional hydraulic fluid-carrying conduits 14a and 14b to conduit 14 and from there into a fluid switch 15 which is adaptable to be selectively in either a two-way or a one-way flow-through mode. As the former, the fluid switch permits the flow of hydraulic fluid out of conduit 14 through switch 15 and into conduit 16, which leads to the four wheel brake cylinders to cause activation of same in the conventional manner; and the switch also permits flow in the reverse direction. As the latter, switch 15 only permits flow in the first described, but not in the reverse, direction. When the switch is in the latter mode, the brakes are adapted to be locked. When the brakes are applied, hydraulic fluid flows past switch 15 in the first direction, but is blocked from returning to the master cylinders, thereby locking the brakes.

Referring to FIG. 2, fluid switch 15 includes a check valve 17 interposed in the flow path between inlet conduit 14 and outlet conduit 16. Spring 18 normally biases check valve 17 closed against its cooperating valve seat 19. Thus, normally, only one-way flow is permitted.

A vertically shiftable pusher 20 is provided within conduit 16 beneath valve 17. When pusher 20 moves into engagement with valve 17, it raises the valve off its seat 19 and permits free flow of hydraulic fluid past narrow pusher 20 in both directions. When pusher 20 is down away from the valve element 17, only one-way flow is permitted to the brake cylinders.

A cam 21 is selectively movable into and out of engagement with the end of pusher 20. In its simplest form, cam 21 merely consists of a circular post with a cut-out, flattened section 22. When cam 21 is axially rotated so that the flattened section 22 faces pusher 20, the pusher is not moving into engagement with valve 17, and one-way flow occurs. When cam 21 is axially rotated so that its rounded portion engages pusher 20, the pusher is pressed into engagement with valve 17, opens the valve, and permits two-way flow.

Cam 21 is connected, by a support post 23 which is appropriately sealed by a fluid-tight bearing, to the pivotable lever 25.

Lever 25 is connected to the plunger 26 of a conventional solenoid 24. When solenoid 24 is activated, it draws plunger 26 to the right, as viewed in FIG. 1. This pivots lever 25 clockwise to its phantom line position, which, in turn, rotates cam 21 clockwise, as viewed in FIG. 1. This causes flattened cam section 22 to come opposite pusher 20, thereby permitting locking of brake pedal 10 in the manner described above. As described further below, when brake pedal 10 is to be released, lever 25 is shifted counterclockwise to its solid line position of FIG. 1, which brings the rounded portion of cam 21 into engagement with pusher 20, thereby causing the pusher to raise valve 17 and permit free, two-way hydraulic fluid flow.

An over-center spring 27 is connected with lever 25 to rapidly move it between its two positions and to securely hold it in each position.

The electrical circuit for causing operation of solenoid 24 leads from ground connection 28; through solenoid 24; lead 30; relay switch 32, whose contacts 34, normally open, are closed by relay coil 36, to be further described below; leads 38, 40; power supply 42; to ground connection 44. Once contacts 34 of relay switch 32 are closed, solenoid 24 is automatically activated and the automatic foot brake locking mechanism operates.

When coil 36 is activated, the magnetic attraction closes the normally open contacts 34. Coil 36 is activated when the circuit within which it is located is completed. This circuit leads from ground connection 46; through coil 36; lead 50; switch 52; lead 54; one or more of switches 55, 56 and 58, which are arranged in electrical parallel to each other in the circuit; lead 60; brake light switch 62; leads 64 and 66; ignition key switch 68; leads 70; 72; 74; power supply 42; to ground connection 44. The switches just mentioned will be described in reverse order.

Ignition key switch 68 is conventional and its contacts are closed when ignition key 76 is turned to the vehicle motor "ON" position.

Conventional vehicle stop light switch 62 is closed when the foot brakes are applied. Conduit 16 has a branch 63a which is connected to stop light switch 62. Elevated hydraulic pressure in conduit 16 due to the brakes being applied closes the contacts to switch 62 and causes the vehicle stop lights to light up. To prevent the stop lights being left on after the vehicle has been parked with the foot brake locked, switch 62 is in circuit with the ignition switch 68. As soon as the ignition switch is turned off, power to the stop lights is also cut off.

Switches 55, 56 and 58 are in electrical parallel. Closing of any of these switches will permit the circuit to be completed.

Gear shift lever switch 58 is a conventional electric switch whose contacts are closed when the gear shift lever 59 is placed in one of the non-drive gears, e.g. Neutral or Park.

The contacts of manual switch 56 are engaged by the operator of the vehicle moving the conventional operating arm of the switch 56 to the contacts engaged position. With switch 56 in this position, every time the other switches in the relay switch operating circuit are closed, the brakes are locked.

Switch 55 is inertia controlled. Its contacts, schematically illustrated as 57a and 57b, are normally open and are closed by the inertia force exerted on the switch by acceleration of the vehicle (which is irrelevant to the brake applying means since that means only operates when the brake is applied) and by the reaction return to stable position which the vehicle undergoes upon stopping after having rapidly decelerated. Usually, in rapid deceleration, the vehicle tilts forward. Upon halting, the vehicle reacts by swinging back to its stable position. Switch 55 is a conventional mercury switch with the fixed contact so placed that rapid vehicle deceleration moves the liquid mercury away from the fixed contact. The liquid shifts into contact with the fixed contact to complete the circuit, once the vehicle has halted completely and has reacted to the deceleration by restabilizing itself. While switch 55 is closed only immediately after the vehicle halts, so long as the circuit which activates coil 36 is even momentarily completed, this is enough to activate solenoid 24 and shift switch 15 to its one-way flow, brakes locked mode.

Conventional switch 52 is engaged by lever 25 after that lever has been shifted to the phantom line, brake locking position. Switch 52 includes contacts which are normally engaged so as to complete the electric circuit to the relay that causes operation of solenoid 24 and which are separated by the shifting of lever 25 into engagement with the operator for switch 52. Thus, prior to shifting of lever 25 to the brake locking position, the contacts of switch 52 are engaged. As soon as the shift occurs and switch 15 has been shifted so that the brakes are locked, the circuit that causes activation of solenoid 24 is broken, whereby power will not be wasted through constant energization of solenoid 24, and the solenoid will not be burned out through long continued and unnecessary activation.

Through the solenoid activating circuit just described, the foot brake locking mechanism operates only when the operator is driving the vehicle, has depressed the foot brake pedal, and has (a) manually closed switch 56, or (b) placed the vehicle in a non-driving gear or (c) halted the vehicle after rapidly decelerating it. When the motor is off and the ignition key switch 68 is off, the solenoid activating circuit is incomplete. The contacts of switch 52 are engaged when lever 25 is in its solid line position before it shifts to its phantom line position. One of switches 56 or 58 is closed, as described above. The brake pedal 10 is depressed closing the contacts of switch 62. Now that the circuit to relay switch coil 36 is completed, relay switch contacts 34 move into engagement, solenoid 24 is activated, and since pedal 10 is depressed, the foot brake will be locked.

FOOT BRAKE LOCKING MECHANISM RELEASE MEANS

As noted above, after the foot brake has been locked, when it is necessary to move the vehicle again, it is desirable to automatically release the locked foot brake.

Turning to FIG. 1, to release the foot brake locking mechanism, switch 15 must be shifted counterclockwise to its solid line position which permits free, two-way flow through the switch, as described above, rather than mere one-way flow away from master cylinders 12, 13. Hydraulic fluid can now flow back from the wheel cylinders to the master cylinders. The springs in the conventional vehicle wheel brake drums (not shown) retract the brake shoes in a conventional manner and instantly release the brakes. Lever 25, as noted above, is connected with plunger 26, which also serves as the plunger for solenoid 152. Thus, activation of solenoid 152 draws plunger 26 counterclockwise and causes release of the foot brake, as just described.

Solenoid 152 is in an electrical circuit which must be completed before the solenoid is activated. The circuit extends from ground connection 156; through solenoid 152; lead 158; relay switch 160, whose contacts 162 are closed when coil 164 is activated as described below; leads 166; 40; power supply 42; to ground connection 44. From the foregoing, it is apparent that when contacts 162 are engaged, due to activation of coil 164, solenoid 152 is activated.

Coil 164 is in an electrical circuit extending from ground connection 168; through motor condition sensing relay switch 170, which includes contacts 80, to be further described below; lead 174; switch 176 for sensing when lever 15 is in the position to lock the foot brakes; lead 178; vehicle motion initiating means sensing switch 180; lead 181; optional inclined surface rollback prevention switch means 182; lead 183; gear shift lever position sensing switch 184; lead 66; ignition key switch 68; leads 70; 72; 74; power supply 42; to ground connection 44.

Considering the switches in the circuit of coil 164 in reverse order, the ignition key switch 68, as previously described, includes contacts which close only when the ignition key is in the "ON" position. Gear shift lever switch 184 includes contacts which are closed only when the gear shift lever is in one of the driving gears, thus showing that the driver wishes the vehicle to move.

Inclined surface rollback prevention switch means 182 is optional. If it is not included, leads 181 and 183 merely merge. Switch means 182 includes a gravity controlled switch means 302 in electrical parallel with a vacuum switch 304 which is connected, through conduit 306, with a conventional vehicle induction manifold (not shown). When the vehicle is on a level surface, switch means 302 is always closed and the circuit through switch means 182 is always complete.

When the vehicle is on an inclined surface and is to be started in the uphill direction, as will be described below, switch means 302 will always be open. When a load is placed on the vehicle motor by causing the vehicle to pull uphill against the now engaged foot brake, contacts 305a and b of vacuum switch 304 close, and the circuit through switch means 182 is complete. Thus, switch means 182 is not closed until the vehicle motor is driving the vehicle uphill with sufficient force to prevent rollback.

On the other hand, switch means 302 is so designed that when the vehicle on the incline is to be started in the downhill direction, switch means 302 is always closed so that the circuit through switch means 182 is complete and there is no need to wait for a pressure decrease in the induction manifold to release the foot brake.

The key to the foregoing operation lies in gravity controlled switch means 302. This is comprised of gear shift lever position responsive switch 308 and gravity responsive shifts 312 and 316.

Switch 308 includes switch arm 309 which is electrically connected with lead 183 and is mechanically operated, through conventional means 307, by gear shift lever 59. When lever 59 is in a vehicle forward motion gear, e.g. Drive or Low, contact arm 309 closes the circuit to contact 310, which leads into switch 312. When lever 59 is in a vehicle rearward motion gear, e.g. Reverse, contact arm 309 closes the circuit to contact 311, which leads into switch 316.

Switch 312 is a gravity controlled switch whose contact element 313 is out of circuit with contact arm 309, when the vehicle is facing uphill on an incline and whose contact element 313 is in circuit with contact arm 309, as illustrated in FIG. 1, when the vehicle is on a level surface or is facing downhill. Contact element 313 leads into circuit lead 181.

When the vehicle is on a level surface or is facing downhill and the vehicle gear shift lever is in a forward motion gear so that arm 309 is in circuit with switch 312, (as illustrated in FIG. 1,) the circuit from lead 183 passes through contact arm 309 and contact element 313 to lead 181, and there would be no delay in release of the foot brake such as might arise from awaiting operation of vacuum switch 304. But, when the vehicle is on an incline and is to move forward uphill, contact element 313 breaks the circuit with switch arm 309. The only way to complete the circuit through switch means 182 is for vacuum switch 304 to be operated by a load being placed on the motor, as described above. In this manner, rollback is prevented.

Gravity controlled switch 312 is a conventional liquid mercury switch with contact element 313 being the liquid mercury, and the contacts within the switch being arranged so that the mercury moves away from the contact leading to switch arm 309 when the vehicle is facing uphill.

Switch 316 is a similar gravity controlled switch to switch 312. Contact element 317 here is out of circuit with contact arm 309 (as illustrated in FIG. 1,) when the vehicle is facing downhill on an incline and is in circuit with contact arm 309 when the vehicle is on a level surface or is facing uphill. Contact element 317 leads into circuit lead 181.

When the vehicle is on a level surface or is facing uphill and the vehicle gear shift lever is in a reverse direction motion gear so that arm 309 is in circuit with switch 316, the circuit from lead 183 passes through contact arm 309 and contact element 317 to lead 181. There would be no delay in release of the foot brake such as might arise from awaiting operation of vacuum switch 304. But, when the vehicle is on an incline and is to move backward uphill, contact element 317 breaks the circuit with switch arm 309. The only way to complete the circuit through switch means 182 is for vacuum switch 304 to be operated by a load being placed on the motor, as described above. In this manner, rollback is prevented.

Gravity controlled switch 316 is also a conventional mercury switch with contact element 317 being the liquid mercury, and the contacts within the switch being arranged so that the mercury moves away from the contact leading to switch arm 309 when the vehicle is facing downhill.

Vehicle motion initiating means sensing switch 180 includes contacts which are closed when the vehicle motion initiating means is first operated to initiate vehicle movement. In FIG. 1, this means comprises vehicle accelerator pedal 185, and when pedal 185 just starts to move down, the contacts of switch 180 are closed, so that when the other switches are closed, the circuit to coil 164 is complete and brake release occurs, and all this before the vehicle begins to move, as now described. Pedal 185 is normally held up by spring 186. This causes a gap 187 between pedal 185 and throttle rod 188. Thus, before the accelerator pedal touches the throttle rod to initiate vehicle movement, the pedal has moved away from switch 180 to open the contacts thereof, so that the brake could be released just before vehicle movement commences.

The above discussed gap 187 also permits independent motion of throttle rod 188. Should a mechanic or other individual manually open the vehicle throttle under the vehicle hood, for example, although throttle rod 188 might move, the spring supported accelerator pedal 185, and thus switch 180, will not be affected, and the locked brakes will not be released. Also, when the automatic choke on the vehicle carburetor is operator to the motor's fast idling speed, before the motor warms up, although the position of the throttle rod might be affected, the position of the accelerator pedal is not affected and there is no undesired release of the brake locking mechanism. Thus, gap 187 ensures that the locked brakes will not be released until the vehicle operator depresses the accelerator pedal indicating his desire that the vehicle move.

Relay switch 80 senses whether the automobile motor is operating. The contacts 80 of the switch are normally biased into engagement. When an electric current flows through coil 82, contacts 80 are drawn apart. Leads 84 and 86, which bring current to coil 82, are, respectively, connected to leads 88 and 90. Leads 88 and 90 are connected into the conventional motor vehicle voltage regulator 92 and into the conventional vehicle alternator 94. Since these items are conventional in motor vehicles, they will not be described in detail. Tracing the current path from lead 90 to lead 88, the path is from lead 90; through leads 93; 96, 98; relay switch 100; lead 102 in switch 100; then contacts 104, which are normally biased closed, but which are caused to be opened due to activation, as described below, of coil 106; lead 108; to lead 88. Lead 98 which passes into switch 100 also connects with ground connection 110. Leads 88 and 90 also merge into lead 112 which, in turn, connects through ignition key switch 68; leads 70; 72; 74; to power supply 42; and then to ground connection 44. Separation of contacts 104 in switch 100 due to activation of coil 106 breaks the circuit which includes leads 88 and 90 and thereby breaks the circuit to coil 82 as the motor runs.

Coil 106 is electrically connected through lead 114 with conventional rotating armature 116 of conventional vehicle alternator 94. When armature 116 rotates, due to the rotation of conventional automobile motor (not shown), in the field of conventional field coil 118, the current generated in armature 116, through lead 114, activates coil 106. This draws apart the normally engaged contacts 104. Thus, as soon as the vehicle motor is operating, the circuit, which includes contacts 104, that charges coil 82 in switch 48 is broken, and contacts 80 resume their normally engaged position.

Contacts 80 are normally engaged. When ignition key 76 is turned to the operative position, thereby closing switch 68, the circuit to coil 82 through relay switch 100 is activated, and contacts 80 are separated. Thus, although the ignition key switch is on, because the vehicle motor is not operating, the circuit to relay switch coil 164 is not complete. When the vehicle motor is finally operating and the armature 116 is rotating, switch contacts 104 are disengaged, coil 82 is deenergized and contacts 80 are reengaged, thereby permitting the circuit to coil 164 to be completed.

Thus, for the foot brake locking mechanism to be released, it is necessary that the operator of the vehicle evince his desire for the vehicle to move by turning on the ignition switch, starting the motor, placing the gear shift lever in a drive gear, and depressing the accelerator pedal. If the rollback prevention device is included and the vehicle is to move uphill, it is also necessary that the accelerator pedal be sufficiently depressed to place a load on the motor. As soon as the driver does all these things, the vehicle is about to move, the circuit to coil 164 is completed, solenoid 152 is activated and lever 15 shifts counterclockwise to its solid line position, thereby raising valve element 17, as described above, so that fluid can return to the master cylinders, and thereby releasing the brake locking mechanism. With the release means described, the vehicle motor will not have to move the vehicle against the drag provided by the foot brake. Because it is not necessary for the operator of a vehicle to remember to release the foot brake locking mechanism, he may be inclined to use the foot brake pedal locking mechanism, described above, which is a safety device in the vehicle.

As with the foot brake locking mechanism, the release means therefor is immediately deactivated as soon as the lever 15 is shifted counterclockwise to its solid line, brake releasing position whereby it engages switch 176 and causes the contacts of that switch to open, thereby breaking the circuit to coil 164 and deactivating solenoid 152. This prevents unnecessary current being drawn from the power supply and protects solenoid 152 from burning out by unnecessarily continued activation.

PARKING BRAKE RELEASE MEANS

Most motor vehicles are provided with a manually operable parking brake that is separate from the foot brake. Turning to FIG. 1, parking brake 200 includes a shaft 202 which is connected by conventional means (not shown) with brake shoes (not shown) of a vehicle. When the parking brake shaft 202 is pulled outward, or to the right, as viewed in FIG. 1, by handle 203 to its phantom line position, the parking brake is engaged. A spring biasing means 204 normally attempts to return shaft 202 to the parking brake release position. Shaft 202 is, therefore, provided with a set of ratchet teeth 206 which are engaged by pawl 208 when the shaft 202 has been shifted to the parking brake engaged position. Pawl 208 is normally biased into secure engagement with ratchet teeth 20 to prevent release of the brake. The parking brake may be conventionally released through, for example, rotation of handle 203 which rotates the ratchet teeth away from the pawl 208, permitting mechanical release of the parking brake.

Some conventionally employed parking brakes use a pivotable, depressible foot pedal, rather than a pull handle, like 203. These other types of brakes do employ a pawl and ratchet locking arrangement like 206, 208, or a similar locking arrangement, which may be released in accordance with the teachings herein.

The present invention is particularly directed to an automatic means for releasing the parking brake. In accordance with the invention, pawl 208 is secured to or is part of the plunger of solenoid 212. When solenoid 212 is activated, by means to be described, pawl 208 is retracted from engagement with ratchet teeth 206, and parking brake shaft 202 is permitted to shift to the left under the influence of biasing means 204, thereby releasing the parking brake.

Solenoid 212 is activated through completion of the circuit extending from ground connection 214; through relay switch 216, whose contacts 218, normally disengaged, are engaged by activation of relay coil 220, as further described below; leads 221; 72; 74; power supply 42; to ground connection 44. When contacts 218 are engaged, the circuit to solenoid 212 is completed.

To cause the engagement of contacts 218 of relay switch 216 requires the completion of the circuit in which relay coil 220 is connected. The parking brake should be released under the same conditions as the foot brake. Accordingly, the switches in the circuit in which coil 220 is connected for releasing the parking brake in most cases are the same as the switches as in the circuit to coil 164 to releasing the foot brake, and in the remaining cases are functionally identical to those used for releasing the foot brake.

The circuit which must be completed to activate coil 220 extends from ground connection 222, through motor condition sensing relay switch 224 whose contacts 226 must be in engagement before the circuit is completed; lead 227; switch 228, which senses when the parking brake has already been applied, and, therefore, should be released; lead 229; accelerator pedal position sensing switch 180; lead 181; optional rollback prevention switch 182; gear shift lever position sensing switch 184; lead 66; ignition key switch 68; leads 70; 72; and 74; power supply 42; to ground connection 44.

Considering the switches just mentioned in reverse order, switches 68, 184, 182 and 180 have previously been discussed. Switch 228 is functionally analogous to switch 176, previously discussed. Switch 228 has its contacts closed when the switch is engaged by a switch operator 230 on shaft 202 of the parking brake. Operator 230 contacts switch 228 only when shaft 202 is drawn to the right and the parking brake is on. Motor condition sensing relay 224 is identical to the previously described motor condition sensing relay 170. Its coil 232 is connected between leads 88, 90 whereby relay 224 acts in the same way as relay 170.

When the operator of the vehicle turns on the ignition switch, starts the motor and the motor is operating, places the vehicle in one of the driving gears, and first touches the accelerator pedal, while the parking brake is on, all of the switches in the circuit to coil 220 are closed, and the coil is activated. Of course, if rollback prevention switch 182 is included, the circuit to coil 220 is not completed until a load is placed on the motor. The circuit to solenoid 212 is thereby completed, causing the parking brake 220 to be released before commencement of movement of the vehicle. Again the brake is released before the vehicle commences movement due to gap 187 and on a hill, due to switch 182, as described above.

As with the foot brake locking mechanism release means, as soon as the parking brake is released, the contacts of switch 228 are opened, since the switch operator 230 is no longer in engagement with the switch, and the circuit to coil 220 is broken, thereby deactivating the coil and deactivating the solenoid 212. This prevents power from continuously being drawn by solenoid 212 and protects the solenoid from being burned out through unnecessary continuous activation.

There has just been described a vehicle foot brake locking mechanism and foot and parking brake locking mechanism release means, which includes an electric switching apparatus to cause the foot brake of a vehicle to be locked when the operator of the vehicle wishes and combines with this, a release means for the foot brake locking mechanism and a release means for the parking brake of the vehicle, both of which release means operate when the vehicle motor is running, the vehicle is in one of the driving gears, and means which initiates movement of the vehicle is about to begin to initiate such movement while the brake still remains engaged.

Although the invention has been described above with respect to its preferred embodiments, it will be understood that many variations and modifications will be obvious to those skilled in the art. It is preferred, therefore, that the scope of the invention be limited not by the specific disclosure herein but only by the appended claims.

I claim:

1. In a movable vehicle having foot brakes operated by a foot brake pedal, a foot brake locking mechanism for locking the foot brakes in the brakes applied position;

said locking mechanism including an electrically operable mechanism for locking said brakes; said electrically operable mechanism being connected to a power source by means of a first electric circuit, which first circuit must be completed before said electrically operable mechanism will cause said foot brakes to lock;

said first circuit including a plurality of switches, with each switch including cooperating contacts, which cooperating contacts of each switch must be engaged to complete said first circuit; said switches are:

an ignition key switch, the contacts of which are engaged when said vehicle ignition key is at the vehicle "ON" position and are separated when said key is at other than the vehicle "ON" position;

a switch connected with said vehicle gear shift lever and having its contacts arranged so that they are engaged when said gear shift lever is shifted into a vehicle non-driving gear and separated when said gear shift lever is shifted into a vehicle driving gear;

a switch responsive to the position of the brake pedal, the contacts of which are closed when the brake pedal is depressed;

a switch mechanically connected with said locking mechanism and having contacts which are caused to be mechanically engaged by said locking mechanism when said locking mechanism is de-activated and which are caused to be disengaged by said locking mechanism when said locking mechanism is activated, whereby once said locking mechanism is activated, said contacts of that said switch separate and said first electric circuit is broken, thereby preventing unneeded power loss and premature deterioration of said electrically operable mechanism;

whereby when said contacts of all of said switches are engaged, said locking mechanism is activated to lock said brake pedal in the brakes applied position;

a foot brake locking mechanism release means including a second electrically operable mechanism; said second electrically operable mechanism being connected to a power source by means of a second electric circuit, which second circuit must be completed before said second electrically operable mechanism will cause release of said foot brake locking mechanism;

said second circuit including a plurality of switches, with each switch having cooperating contacts which must be engaged to complete said second circuit; said second circuit switches including:

said ignition key switch;

a second gear shift lever switch connected with said gear shift lever and having its contacts arranged so that they are engaged when said gear shift lever is shifted into a vehicle driving gear and separated when said gear shift lever is shifted into a vehicle non-driving gear;

a second switch mechanically connected with said locking mechanism and having contacts which are mechanically engaged by said locking mechanism when said locking mechanism is activated and which are separated by said locking mechanism when said locking mechanism is deactivated;

a first motor condition sensing switch, the contacts of which are normally engaged and are responsive to activation of a first relay; a first relay associated with and positioned to act upon said contacts of said first motor condition sensing switch to cause same to separate when the vehicle motor is off while said ignition key switch is at the "ON" position and to cause same to reengage when the vehicle motor is also on;

a vehicle movement initiating means switch connected with the means in the vehicle which initiates movement of the vehicle, which switch has contacts that are normally disengaged and which are engaged by operation of the vehicle movement initiating means in a manner which will initiate vehicle movement;

whereby when said contacts of all of said switches of said second circuit are engaged, said foot brake pedal locking mechanism release means is activated to release said brake pedal from said locking mechanism.

2. In the movable vehicle having foot brakes and a foot brake locking mechanism release means of claim 1, said vehicle motion initiating means comprising an accelerator pedal that is adapted to move into engagement with and to then operate a rod connected with the vehicle throttle, which rod, when operated, causes throttle operation;

means for supporting said accelerator pedal a predetermined distance away from said throttle rod;

said vehicle movement initiating means switch being positioned to engage said accelerator pedal when that said pedal is held away from said throttle rod; that said switch being so positioned that as soon as said accelerator pedal is moved toward said throttle rod, the contacts of that said switch are caused to be engaged.

3. In the movable vehicle having foot brakes and a foot brake locking mechanism release means of claim 1, said second circuit further including an uphill travel rollback prevention switch means comprising, in electrical parallel: a gravity controlled switch means the contacts of which are adapted to be engaged when the vehicle is on a level surface and when the vehicle is to move downhill on an incline and the contacts of which are adapted to be disengaged when the vehicle is to move uphill, and a vacuum switch connected to the vehicle induction manifold and whose contacts are adapted to be engaged upon a reduction of pressure in the induction manifold.

4. In the movable vehicle having foot brakes and a foot brake locking mechanism release means of claim 1, said vehicle having a parking brake which is applied by manual means by the vehicle operator, a locking mechanism for holding said parking brake in the applied position after it has been manually applied, and a parking brake locking mechanism release means;

said parking brake locking mechanism including a holding device for engaging and holding said parking brake in the applied position;

said parking brake locking mechanism release means including a third electrically operable mechanism for releasing said parking brake from said second holding device; said third electrically operable mechanism being connected to a power source by means of a third electric circuit, which third circuit must be completed before said third electrically operable mechanism will cause release of said parking brake;

said third circuit including a plurality of switches, with each switch having cooperating contacts which must be engaged to complete said third circuit; said third circuit switches including:

said ignition key switch;

said second gear shift lever switch;

a third switch mechanically connected with said parking brake and having contacts which are mechanically engaged by said parking brake when said parking brake is locked in the applied position and which are separated by said parking brake when said parking brake is released from the applied position;

a second motor condition sensing switch, the contacts of which are normally engaged and are responsive to activation of a second relay; a second relay associated with and positioned to act upon said contacts of said second motor condition sensing switch to cause same to separate when the vehicle motor is off while said ignition key switch is at the "ON" position and to cause same to reengage when the vehicle motor is also on;

said vehicle motion initiating means switch;

whereby when said contacts of all of said switches of said third circuit are engaged, said parking brake locking mechanism is released to release said parking brake from the applied position.

5. In the movable vehicle having parking brakes and a parking brake locking mechanism release means of claim 4, said third circuit further including an uphill travel rollback prevention switch means comprising, in electrical parallel; a gravity controlled switch means the contacts of which are adapted to be engaged when the vehicle is on a level surface and when the vehicle is to move downhill on an incline and the contacts of which are adapted to be disengaged when the vehicle is to move uphill, and a vacuum switch connected to the vehicle induction manifold and whose contacts are adapted to be engaged upon a reduction of pressure in the induction manifold.

6. In the movable vehicle having parking brakes and a parking brake locking mechanism release means of claim 4, said vehicle motion initiating means comprising an accelerator pedal that is adapted to move into engagement with and to then operate a rod connected with the vehicle throttle, which rod, when operated, causes throttle operation;

means for supporting said accelerator pedal a predetermined distance away from said throttle rod;

said vehicle movement initiating means switch being positioned to engage said accelerator pedal when that said pedal is away from said throttle rod; that said switch being so positioned that as soon as said accelerator pedal is moved toward said throttle rod, the contacts of that said switch are caused to be engaged.

7. In the movable vehicle having brakes of claim 1, said first circuit further including a manually operable switch, the contacts of which are engageable and separable by the vehicle operator; said manually operable switch being connected in electrical parallel to said switch connected with said vehicle gear shift lever.

8. In the movable vehicle having brakes of claim 1, said first circuit further including an inertia controlled switch the contacts of which are closed upon the vehicle halting after undergoing rapid deceleration.

9. In the movable vehicle having brakes of claim 8, wherein said inertia controlled switch is a mercury switch the fixed contact of which is positioned to be contacted by the liquid mercury contact on the reaction motion of the vehicle when it is halted after rapid deceleration.

10. In the movable vehicle having brakes of claim 8, said first circuit further including a manually operable switch, the contacts of which are engageable and separable by the vehicle operator; said manually operable switch being connected in electrical parallel to said switch connected with said vehicle gear shift lever.

11. In the movable vehicle having brakes of claim 1, said electrically operable mechanism comprising a solenoid device having a plunger connected to said locking mechanism and being positioned to cause activation of said locking mechanism when said first circuit, which is connected to operate upon said solenoid device, is completed.

12. In the movable vehicle having brakes of claim 11, said solenoid device being connected to said power supply through the contacts of a first relay; said contacts of said first relay being normally separated; said first relay being connected with said first electric circuit such that when said first electric circuit is completed, said contacts of said first relay are engaged and the circuit to said solenoid device is completed.

13. In the movable vehicle having brakes of claim 11, said foot brake pedal being connected to a master cylinder hydraulic fluid source and said fluid source being connected to the vehicle brakes, whereby depressing said foot brake pedal transmits fluid pressure to the vehicle brakes to brake the vehicle;

said locking mechanism further comprising a flow switch interposed between said brake pedal and the vehicle brakes, which switch is selectively adjustable between a first position which permits one-way flow away from said brake pedal, thereby only permitting said brake pedal to be depressed and the brakes to be applied, and a second position which permits two-way flow both away from and back towards said brake pedal;

said solenoid device plunger being connected with said switch to cause same to shift to its said first position when said solenoid device is activated.

14. In the movable vehicle having foot brakes operated by a foot pedal of claim 13, said foot brake locking mechanism release means;

being connected with said flow switch in a manner such that when said release means is activated, it causes said flow switch to shift to its said second position.

15. In a movable vehicle having foot brakes operated by a foot pedal, a foot brake locking mechanism; and a foot brake locking mechanism release means;

said release means including an electrically operable mechanism for releasing said foot brakes from said locking mechanism; said electrically operable mechanism being connected to a power source by means of a first electric circuit, which first circuit must be completed before said electrically operable mechanism will cause release of said brakes;

said first circuit including a plurality of switches, with each switch having cooperating contacts which must be engaged to complete said first circuit; said switches including:

an ignition key switch, the contacts of which are engaged when the vehicle ignition key is at the vehicle "ON" position and are disengaged when said key is at other than the vehicle "ON" position;

a gear shift lever switch connected with said gear shift lever and having its contacts arranged so that they are engaged when said gear shift lever is shifted into a vehicle driving gear and separated when said gear shift lever is shifted into a vehicle non-driving gear;

a motor condition sensing switch, the contacts of which are normally engaged and are responsive to activation of a first relay; a first relay associated with and positioned to act upon said contacts of said motor condition sensing switch to cause same to separate when the vehicle motor is off while said ignition key switch is at the vehicle "ON" position and to cause same to reengage when the vehicle motor is also on;

a switch mechanically connected with said locking mechanism and having contacts which are mechanically engaged by said locking mechanism when said locking mechanism is activated and which are separated by said locking mechanism when said locking mechanism is deactivated; whereby once said locking mechanism is released under the influence of said electrically operable mechanism, said contacts of said switch that is mechanically connected with said locking mechanism separate and said first electric circuit is broken, thereby preventing unneeded power loss and premature deterioration of said electrically operable mechanism;

a vehicle movement initiating means switch connected with the means in the vehicle which initiates movement of the vehicle, which switch has contacts that are normally disengaged and which are engaged by operation of the vehicle movement initiating means in a manner which will initiate vehicle movement;

whereby when said contacts of all of said switches of said first circuit are engaged, said foot brake pedal locking mechanism release means is activated to release said brake pedal from said locking mechanism.

16. In the movable vehicle having foot brakes and a foot brake locking mechanism release means of claim 15, said first circuit further including an uphill travel rollback prevention switch means comprising, in electrical parallel; a gravity controlled switch means the contacts of which are adapted to be engaged when the vehicle is on a level surface and when the vehicle is to move downhill on an incline and the contacts of which are adapted to be disengaged when the vehicle is to move uphill, and a vacuum switch connected to the vehicle induction manifold and whose contacts are adapted to be engaged upon a reduction of pressure in the induction manifold.

17. In the movable vehicle having foot brakes and a foot brake locking mechanism release means of claim 15, said first circuit including a gravity controlled switch means; said gravity controlled switch means comprising:

a gear shift lever position responsive switch adapted to be selectively engageable with one of two gravity controlled switch devices which are connected in electrical parallel;

said gear shift lever switch being connected with a first gravity controlled switch device when the gear shift lever is in one of the forward motion gears, and being connected with the second such switch device when the gear shift lever is in a rearward motion gear;

said first gravity controlled switch having its contacts so arranged that they are disengaged when the vehicle is facing uphill and engaged when the vehicle is on a level surface and when it is facing downhill;

said second gravity controlled switch having its contacts so arranged that they are disengaged when the vehicle is facing uphill and engaged when the vehicle is on a level surface and when it is facing uphill.

18. In the movable vehicle having foot brakes and a foot brake locking mechanism release means of claim 17, both said first and said second gravity controlled switch devices being mercury switches with the fixed contact being positioned to be contacted by the movable mercury contact when the vehicle is respectively facing other than uphill and other than downhill.

19. In the movable vehicle having foot brakes and a foot brake locking mechanism release means of claim 15, said vehicle motion initiating means comprising an accelerator pedal that is adapted to move into engagement with and to then operate a rod connected with the vehicle throttle, which rod, when operated, causes throttle operation;

means for supporting said accelerator pedal a predetermined distance away from said throttle rod;

said vehicle movement initiating means switch being positioned to engage said accelerator pedal when that said pedal is held away from said throttle rod; that said switch being so positioned that as soon as said accelerator pedal is moved toward said throttle rod, the contacts of that said switch are caused to be engaged.

20. In the movable vehicle having foot brakes, a foot brake locking mechanism and a release means for said locking mechanism of claim 15, said electrically operable mechanism comprising a solenoid device having a plunger connected to said brake locking mechanism and being positioned to move said locking mechanism away from said brakes applied position when said first circuit, which is connected to operate upon said solenoid device, is completed.

21. In the movable vehicle having foot brakes, a foot brake pedal locking mechanism and a release means for said locking mechanism of claim 15, a second relay which is connected through a second electric circuit to said first relay; said second relay having contacts, which, when engaged, complete the second circuit to said first relay, and which, when separated, break said second circuit to said first relay;

a power supply connected to said first relay through a third electric circuit including said second relay and said ignition key switch; when said contacts of said ignition key switch are engaged and said contacts of said second relay are engaged, said second circuit is completed and said first relay is activated and said contacts of said motor condition sensing switch are separated;

said second relay being connected with the motor of said vehicle such that when said motor is operating, said contacts of said second relay are separated and said second circuit to said first relay is broken thereby deactivating said first relay, which, in turn, permits said contacts of said motor condition sensing switch to be normally biased into engagement, which permits said first electric circuit of said electrically operable mechanism to be completed.

22. In the movable vehicle having foot brakes, a foot brake locking mechanism and a release means for said locking mechanism of claim 21, said solenoid device being connected to said power supply through the contacts of a third relay; said contacts of said third relay being normally separated; said third relay being connected with said first electric circuit such that when said first electric circuit is completed, said contacts of said third relay are engaged and the circuit to said solenoid device is completed.

23. In a movable vehicle having a parking brake which is applied by manual means by the vehicle operator, a locking mechanism for holding said parking brake in the applied position after it has been manually applied, and a parking brake locking mechanism release means;

said parking brake locking mechanism including a holding device for engaging and holding said parking brake in the applied position;

said release means including an electrically operable mechanism for releasing said parking brake from said holding device; said electrically operable mechanism being connected to a power source by means of a first electric circuit, which first circuit must be completed before said electrically operable mechanism will cause release of said parking brake;

said first circuit including a plurality of switches, with each switch having cooperating contacts which must be engaged to complete said first circuit; said switches including:

an ignition key switch, the contacts of which are engaged when said vehicle ignition key is at the vehicle "ON" position and are disengaged when said key is at other than the "ON" position;

a gear shift lever switch connected with said gear shift lever and having its contacts arranged so that they are engaged when said gear shift lever is shifted into a vehicle driving gear and separated when said gear shift lever is shifted into a vehicle non-driving gear;

a switch mechanically connected with said parking brake and having contacts which are mechanically engaged by said parking brake when said parking brake is locked in the applied position and which are separated by said parking brake when said parking brake is released from the applied position;

a motor condition sensing switch, the contacts of which are normally engaged and are responsive to activation of a first relay; a first relay associated with and positioned to act upon said contacts of said motor condition sensing switch to cause same to separate when the vehicle motor is off while said ignition key switch is at the "ON" position and to cause same to reengage when the vehicle motor is also on;

a vehicle motion initiating means switch connected with the means in the vehicle which initiates movement of the vehicle, which switch has contacts that are normally disengaged and which are engaged by operation of the vehicle movement initiating means in a manner which first initiates the vehicle movement;

whereby when said contacts of all of said switches of said first circuit are engaged, said parking brake locking mechanism is released to release said parking brake from the applied position.

24. In the movable vehicle having parking brakes and a parking brake locking mechanism release means of claim 23, said first circuit further including an uphill travel rollback prevention switch means comprising, in electrical parallel; a gravity controlled switch means the contacts of which are adapted to be engaged when the vehicle is on a level surface and when the vehicle is to move downhill on an incline and the contacts of which are adapted to be disengaged when the vehicle is to move uphill, and a vacuum switch connected to the vehicle induction manifold and whose contacts are adapted to be engaged upon a reduction of pressure in the induction manifold.

25. In the movable vehicle having parking brakes and a parking brake locking mechanism release means of claim 23, said first circuit including a gravity controlled switch means; said gravity controlled switch means comprising:

a gear shift lever position responsive switch adapted to be selectively engageable with one of two gravity controlled switch devices which are connected in electrical parallel;

said gear shift lever switch being connected with a first gravity controlled switch device when the gear shift lever is in one of the forward motion gears, and being connected with the second such switch device when the gear shift lever is in a rearward motion gear;

said first gravity controlled switch having its contacts so arranged that they are disengaged when the vehicle is facing uphill and engaged when the vehicle is on a level surface and when it is facing downhill;

said second gravity controlled switch having its contacts so arranged that they are disengaged when the vehicle is facing uphill and engaged when the vehicle is on a level surface and when it is facing uphill.

26. In the movable vehicle having parking brakes and a parking brake locking mechanism release means of claim 25, both said first and said second gravity controlled switch devices being mercury switches with the fixed contact being positioned to be contacted by the movable mercury contact when the vehicle is respectively facing other than uphill and other than downhill.

27. In the movable vehicle having parking brakes and a parking brake locking mechanism release means of claim 23, said vehicle motion initiating means comprising an accelerator pedal that is adapted to move into engagement with and to then operate a rod connected with the vehicle throttle, which rod, when operated, causes throttle operation;

means for supporting said accelerator pedal a predetermined distance away from said throttle rod;

said vehicle movement initiating means switch being positioned to engage said accelerator pedal when that said pedal is held away from said throttle rod; that said switch being so positioned that as soon as said accelerator pedal is moved toward said throttle rod, the contacts of that said switch are caused to be engaged.

28. In the movable vehicle having a parking brake, a parking brake locking mechanism and a release means for said locking mechanism of claim 23, a second relay which is connected through a second electric circuit to a first relay; said second relay having contacts which, when engaged, complete the second circuit to said first relay, and which, when separated, break said second circuit to said first relay;

a power supply connected to said first relay through a third electric circuit including said second relay and said ignition key switch; when said contacts of said ignition key switch are engaged and said contacts of said second relay are engaged, said second circuit is completed and said first relay is activated and said contacts of said motor condition sensing switch are separated;

said second relay being connected with the motor of said vehicle such that when said motor is operating, said contacts of said second relay are separated and said second circuit to said first relay is broken thereby deactivating said first relay, which, in turn, permits said contacts of said motor condition sensing switch to be normally biased into engagement, which permits said first electric circuit of said electrically operable mechanism to be completed.

29. In the movable vehicle having a parking brake, a parking brake locking mechanism and a release means for said locking mechanism of claim 23, said electrically operable mechanism comprising a solenoid device having a plunger connected to said locking mechanism, and said solenoid device and plunger thereof being positioned to engage said locking mechanism and cause same to be released when said first circuit, which is connected to operate upon said solenoid device, is completed.

30. In the movable vehicle having a parking brake, a parking brake locking mechanism and a release means for said locking mechanism of claim 29, said solenoid device being connected to said power supply through the contacts of a third relay; said contacts of said third relay being normally separated; said third relay being connected with said first electric circuit such that when said first electric circuit is completed, said contacts of said third relay are engaged and the circuit to said solenoid device is completed.

* * * * *